United States Patent
Desineni et al.

(10) Patent No.: US 9,819,429 B2
(45) Date of Patent: Nov. 14, 2017

(54) EFFICIENT LOAD SHARING AND ACCELERATING OF AUDIO POST-PROCESSING

(71) Applicant: Qualcomm Innovation Center, Inc., San Diego, CA (US)

(72) Inventors: Harikishan Desineni, San Diego, CA (US); Alexy Mathew Joseph, San Diego, CA (US); SathishKumar Mani, San Diego, CA (US); Ravi Alamanda, San Diego, CA (US)

(73) Assignee: QUALCOMM Innovation Center, Inc., San Diego, CA (US)

( * ) Notice: Subject to any disclaimer, the term of this patent is extended or adjusted under 35 U.S.C. 154(b) by 108 days.

(21) Appl. No.: 14/861,682

(22) Filed: Sep. 22, 2015

(65) Prior Publication Data
US 2016/0111093 A1    Apr. 21, 2016

Related U.S. Application Data

(60) Provisional application No. 62/066,544, filed on Oct. 21, 2014.

(51) Int. Cl.
| | |
|---|---|
| *G06F 17/00* | (2006.01) |
| *H04H 60/04* | (2008.01) |
| *H04N 21/439* | (2011.01) |
| *G06F 13/12* | (2006.01) |
| *G06F 15/163* | (2006.01) |
| *G06F 3/16* | (2006.01) |
| *G10L 19/26* | (2013.01) |

(52) U.S. Cl.
CPC ............ *H04H 60/04* (2013.01); *G06F 3/165* (2013.01); *G06F 13/12* (2013.01); *G06F 15/163* (2013.01); *H04N 21/4392* (2013.01); *G10L 19/26* (2013.01)

(58) Field of Classification Search
CPC .. H04H 60/04; H04N 21/4392; H04N 21/439; G10L 19/26; G06F 3/165; G06F 13/12; G06F 13/122; G06F 13/124; G06F 15/16; G06F 17/00; G06F 13/105; G10H 2230/041; G11B 20/10527; G11B 2020/1062; G11B 2020/10546
See application file for complete search history.

(56) References Cited

U.S. PATENT DOCUMENTS 6,002,441 A * 12/1999 Bheda ................ H04N 21/4143
375/240.26

* cited by examiner

*Primary Examiner* — Fan Tsang
*Assistant Examiner* — David Siegel
(74) *Attorney, Agent, or Firm* — Neugeboren O'Dowd PC

(57) ABSTRACT

Provided are a method and device for audio post-processing. The method may comprise receiving, at a first processor, an audio signal, detecting, at the first processor, a plurality of post-processing modules for altering the audio signal, and creating, based on information identifying functions of the plurality of post-processing modules, an optimized acceleration module. It may further comprise sending, through the optimized acceleration module, a buffer packet of the audio signal along a single data path to a second processor and post-processing, at the second processor, the buffer packet of the audio signal through each of a plurality of associated post-processing modules that correspond to the post-processing modules on the first processor, controlling each associated post-processing module via control paths from each corresponding post-processing module, and receiving, at the first processor, a post-processed buffer packet of the audio signal via a single return data path.

18 Claims, 12 Drawing Sheets

EFFICIENT LOAD SHARING AND ACCELERATING OF AUDIO POST-PROCESSING

CLAIM OF PRIORITY UNDER 35 U.S.C. §119

The present Application for Patent claims priority to Provisional Application No. 62/066,544 entitled "EFFICIENT WAY OF LOAD SHARING AND ACCELERATING AUDIO POST PROCESSING ON MOBILE PLATFORMS" filed Oct. 21, 2014, and assigned to the assignee hereof and hereby expressly incorporated by reference herein.

TECHNICAL FIELD

The present disclosure relates generally to audio devices, and more specifically to digital audio processing.

BACKGROUND

High fidelity audio playback is one of the most desired components in present day mobile computing devices such as smart phones, tablet computers, and other media-playing devices. These computing devices may render audio through speakers (e.g., built-in or external) and headsets (e.g., wired and wireless) connected to the device. It has become increasingly important to have the ability to process audio in many multimedia applications, such as audio and video playback, gaming and other telecommunications. As audio technology progresses, enhancements in sound quality based on the end device rendering the audio output are sought. One of the pivotal components in audio digital processing systems is audio post-processing. Audio post-processing components receive output from audio decoders which is then processed to enhance the quality based on various factors, including the characteristics of the output device on which audio playback is rendered. Audio post-processing is a step that happens prior to mixing and analog conversion.

SUMMARY

Figure 1:
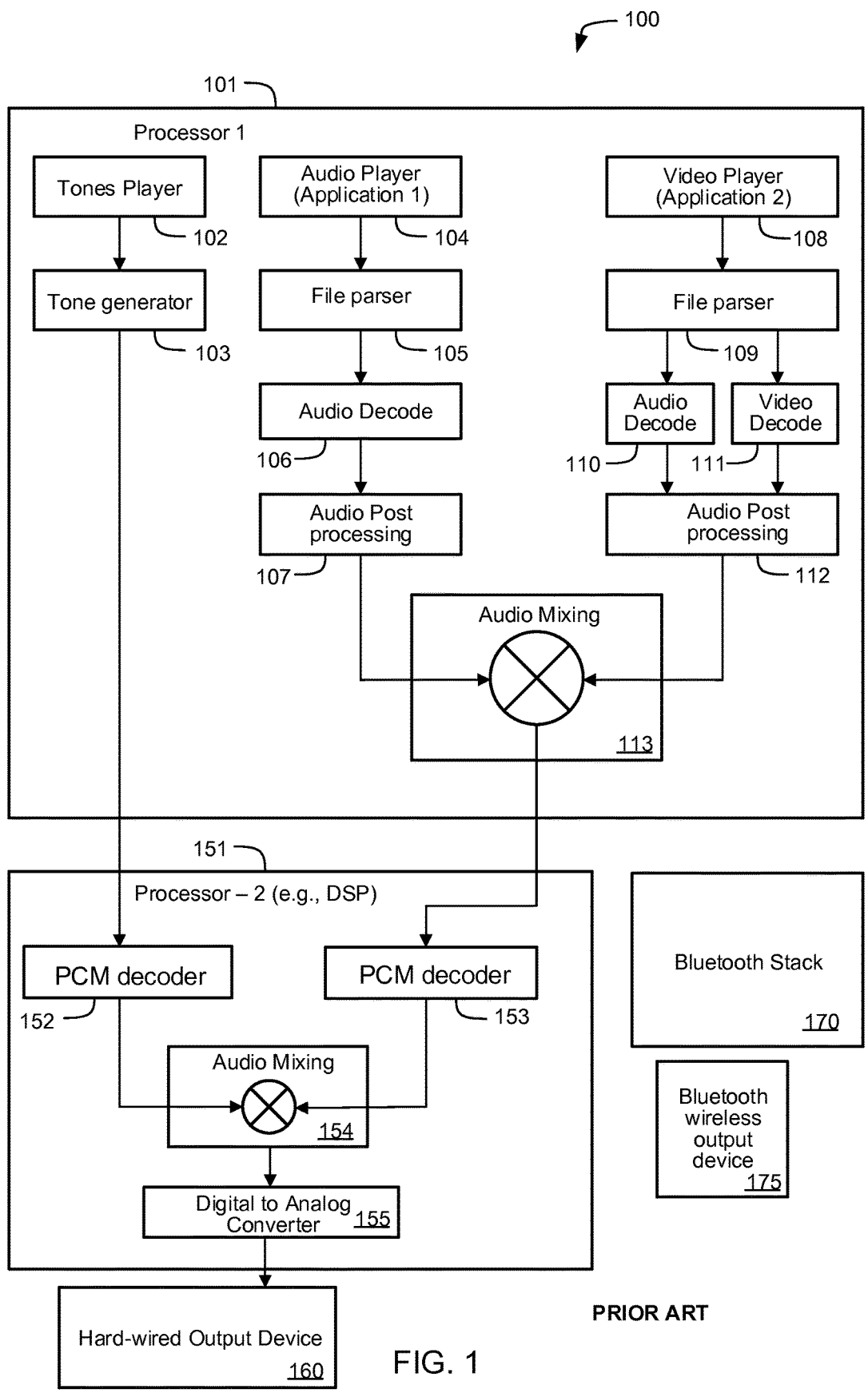
FIG. 1 is a diagram of a prior art audio playback architecture utilizing two processors.

An aspect of the present disclosure provides a method for audio post-processing. The method may comprise receiving, at a first processor, a decoded audio signal, and then detecting, at the first processor, a plurality of post-processing modules for altering the decoded audio signal. The method may further comprise creating, based on information identifying functions of the plurality of post-processing modules, an optimized acceleration module and sending, through the optimized acceleration module, a buffer packet of the decoded audio signal along a single data path to a second processor. Then, the method may include post-processing, at the second processor, the buffer packet of the decoded audio signal through each of a plurality of associated post-processing modules that correspond to the post-processing modules on the first processor, controlling each associated post-processing module via control paths from each corresponding post-processing module, and receiving, at the first processor, a post-processed buffer packet of the decoded audio signal via a single return data path.

Another aspect of the present disclosure provides a media player device comprising a first processor configured with a plurality of post-processing modules to alter decoded audio signals and a second processor configured with a plurality of associated post-processing modules that correspond with the plurality of post-processing modules from the first processor. The media player device may also comprise an optimized acceleration module configured to transfer a buffer packet of a decoded audio signal from the first processor to the second processor via a single data path, and to receive a post-processed buffer packet of the decoded audio signal from the second processor back to the first processor via a single return data path, as well as an audio output device controlled by the first processor and configured to render the post-processed buffer packet of the decoded audio signal.

Another aspect of the present disclosure provides a non-transitory, computer-readable storage medium, encoded with processor readable instructions to perform a method for audio post-processing. The method may comprise receiving, at a first processor, a decoded audio signal and then detecting, at the first processor, a plurality of post-processing modules for altering the decoded audio signal. The method may further comprise creating, based on information identifying functions of the plurality of post-processing modules, an optimized acceleration module and sending, through the optimized acceleration module, a buffer packet of the decoded audio signal along a single data path to a second processor. Then, the method may include post-processing, at the second processor, the buffer packet of the decoded audio signal through each of a plurality of associated post-processing modules that correspond to the post-processing modules on the first processor, controlling each associated post-processing module via control paths from each corresponding post-processing module, and receiving, at the first processor, a post-processed buffer packet of the decoded audio signal via a single return data path.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
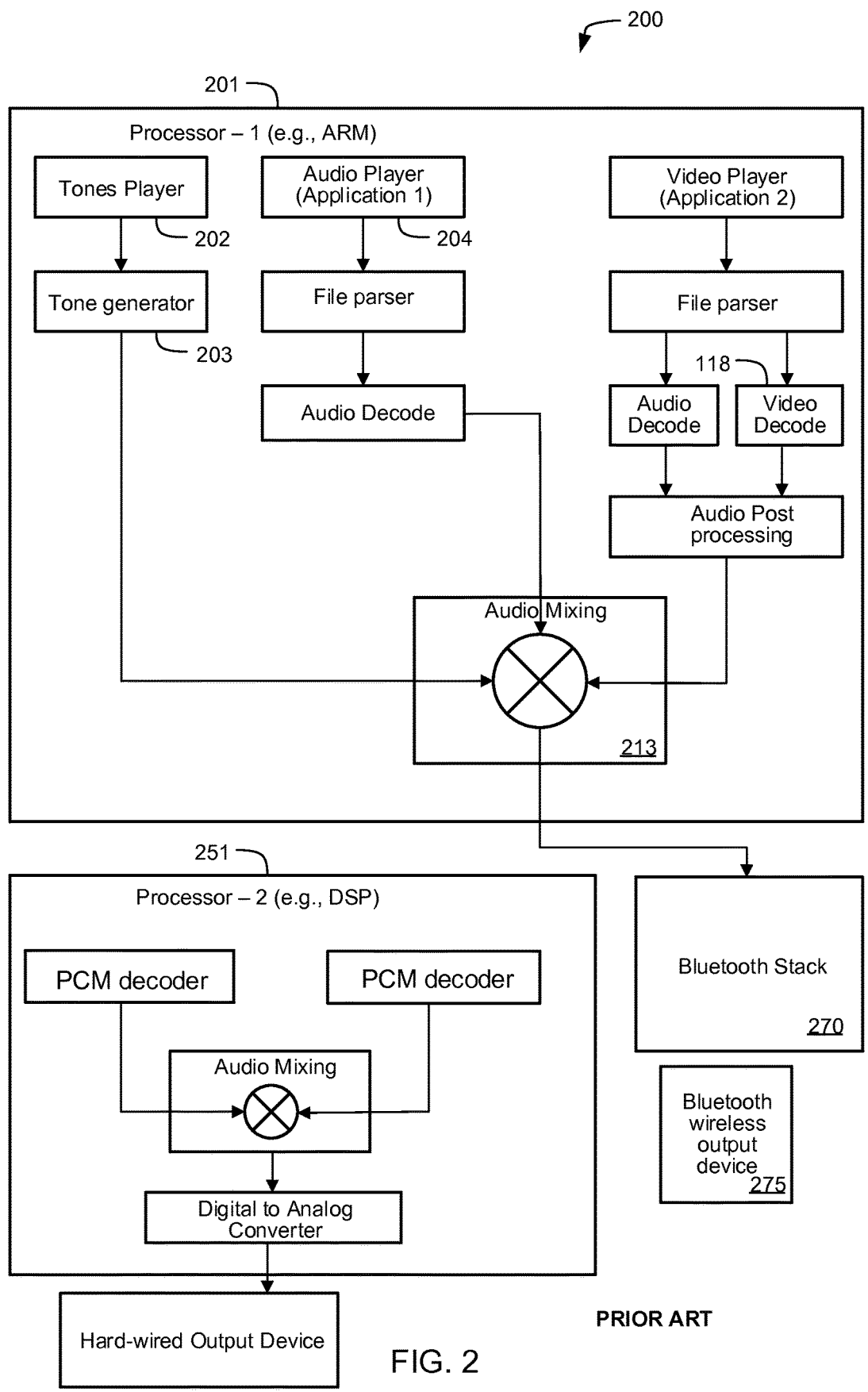
FIG. 2 is another diagram of a prior art audio playback architecture utilizing two processors.

The schematic in FIG. 1 shows a prior art playback architecture 100, (such as those seen in various Android® mobile communication device operating systems) where one or more output devices (e.g., a built-in speaker, an external speaker, a wired headset, or a wireless headset) are controlled by multiple processors. FIGS. 1 and 2 show that the combination of a first processor 101 and a second processor 151 control playback on one or more hard-wired output devices 160, and the first processor 101 alone controls playback on a Bluetooth wireless output device 175.

In the example depicted in FIG. 1, there is a tone player 102 and a tone generator 103, which are modules that play "system tones" such as Dual-Tone Multi-Frequency (DTMF) tones (i.e., number key tones), alert tones (such as a notification of a message received tone) and other simple tones that mobile communication devices typically play. In some architectures, a tone player 102 and a tone generator 103 could be one component, and could be implemented as software in combination with hardware on the first processor 101. The tone player 102 and/or the tone generator 103 can generate a digital encoded pulse code modulation (PCM) signal itself. That is, the tone player 102 and or tone generator 103 may not generate an analog signal that is converted into a digital signal, but rather may produce a digital PCM signal itself. In the example depicted, there is a second processor 151, which is implemented as a digital signal processor (DSP). This DSP 151 has a PCM decoder component 152, which decodes the digital PCM signal from the tone generator 103. The DSP 151 also has an audio mixing component 154, which mixes audio from various sources in order to play audio over a single output. Though the example shows the signal moving from the PCM decoder 152 to the audio mixing component 154, a tone from the tone generator 103 may not necessarily be 'mixed' with any other audio signals. For example, if a user of a mobile communications device presses a number key to make a phone call, and no other audio is being processed by the device at the time, the DTMF tone that is generated upon the pressing of the number key will not be mixed at the audio mixing component 154, and its signal will instead pass through to a digital to analog converter (DAC) 155, which creates the audible analog output to go to the speaker.

Still referring to FIG. 1, the first processor 101 as depicted contains an audio player 104. The audio player 104 may be any application that gives the user an option to playback audio files. The application of the audio player 104 could be, to name a few examples, a music player for playing local files, a music player for streaming remote internet files (such as those that exist on a server), an audio recorder in a file playback mode, a navigation application, a personal assistant application, or a game. The first processor 101 also has a file parser component 105, which opens and interprets an audio file, such as an audio file from the audio player 104. This file parser component 105 understands the layout of the file and retrieves audio content from the file. In many applications, audio files are in compressed formats (e.g., lossless or lossy compressed formats). For these compressed audio files, an audio decode component 106 decodes compressed audio into PCM (pulse code modulation) samples. In some applications, audio files are uncompressed (e.g., PCM and LPCM formats), in which case the audio decode component 106 would act as a pass through component. Next, the audio file may be processed through an audio post-processing component 107, which applies various effects on the audio being played. These effects may be anything from simple effects like a volume ramp to very complicated effects like virtualization. The various effects that can be applied through post-processing are numerous and well known in the art.

The architecture 100 may also contain a video player 108. The video player 108 may represent a second application and may be similar to the audio player in many ways, except that it also plays video files. The video player may be implemented in a number of different kinds of applications, such as a player for local video files, a player for remote streaming of internet video files located on a server, or a game. The first processor 101 may also have a separate file parser 109 for parsing video files, but this file parser 109 may be implemented in a single file parser in combination with file parser 105. The first processor 101 may also have a separate audio decoder component 110 and video decoder component 111 for processing compressed audio and video portions of the video file, respectively. The audio decoder component 110 may be implemented as a single audio decoder component in combination with audio decoder component 106. The video player 108 may have its own audio post-processing component 112 for post-processing of the audio generated from the video file, but it may also be implemented as a single audio post-processing component 107. After files from the audio player 104 and/or video player 108 are decoded (i.e., by audio decoders 106, 110, or video decoder 111) and post-processed (i.e., by audio post processors 107, 112), the files may be mixed by an audio mixing component 113 in the first processor 101. The audio mixing component 113 mixes audio from various sources to playback over one output. If no mixing from various sources was required, for example, if there was only audio from one source, the audio mixing component 113 might act as a pass-through. In some prior art embodiments, the mixed audio from audio mixing component 113 might be sent in an encoded PCM format to the DSP 151, then decoded by a PCM decoder 153. As depicted in FIG. 1, the PCM decoder 153 may be a separate PCM decoder from PCM decoder 152, but they may also be implemented as a single PCM decoder. The DSP 151 may also have its own audio mixing component 154, which mixes audio from multiple sources. As an example in which both the audio mixing component 113 on the first processor 101 and the audio mixing component 154 on the DSP 151 would be used, a user might be playing a video (with a video/audio file), while simultaneously using a navigation system (with an audio file), and may receive a notification of a received message (from the tone generator 103). In this case, the video and the navigation system sounds would be mixed at the audio mixing component 113, and the combination of the two would be further mixed with the sound from the tone generator 103 at the audio mixing component 154. The DAC 155 is used to convert audio to analog for actual playback on an output device 160. FIG. 1 also depicts Bluetooth audio processing hardware 170 and a Bluetooth wireless output device 175 (e.g., a wireless headset), which are not utilized in the example illustrated.

FIG. 2 shows another prior art playback architecture 200 where an output device (e.g., an internal speaker or a Bluetooth wireless headset) is controlled by a single processor even though the device comprises multiple processors. FIG. 2, when contrasted with FIG. 1, is different in the sense that FIG. 2 depicts audio being rendered through a separate Bluetooth Stack 270 and played through a Bluetooth wireless output device 275. Those skilled in the art will appreciate that a Bluetooth stack is a logical configuration of software and hardware on a computing device that allows a Bluetooth wireless device to receive information transmitted from the computing device. In FIG. 2, the Bluetooth Stack 270 is directly controlled by the first processor 201. Although the architecture 200 has a DSP 251, that DSP 251 is only used for rendering output to wired devices, and when the Bluetooth wireless output device 275 is used, the DSP 251 may not be used for audio processing at all. In the example depicted, audio and video files are being played for a user through a wireless Bluetooth headset. FIG. 2 depicts a first processor 201, which may be implemented by, for example, an ARM processor, and may be substantially similar to the first processor 101 depicted in FIG. 1, even though there is no separate audio post-processing component for the audio player 204. Another difference between FIG. 1 and FIG. 2 is that the audio mixing of the tones from the tone generator 203 takes place at the audio mixing component 213 on the first processor 201, instead of on the DSP 251. In implementations of the present disclosure, architectures similar to both FIGS. 1 and 2 may be used. In FIG. 2, all audio is mixed in the first processor 201 itself because the mixed audio is rendered to the Bluetooth stack 270. In other prior art embodiments, the first processor 201 may be the only processor used when audio is rendered to other kinds of output device stacks. For example, certain wireless output devices are implemented through a USB stack comprising software and hardware.

A few examples of cutting edge audio signal processing technologies that enhance the richness in the audio quality are Dolby Surround®, Digital Theater Systems® (DTS) HeadphoneX®, SRS TruMedia® and Qualcomm Snapdragon Audio Plus®. The post-processing algorithms from such technologies have requirements for intense processing power because they consume high bandwidth, memory, and power of the processing unit on the computing device and may prove to be costly when enabled in conjunction with other applications such as graphics or high resolution video playback. Many audio post-processing components include multiple modules that each provide different audio effects. In the prior art, as depicted in FIGS. 1 and 2, sometimes powerful processors (such as DSPs) are underutilized. Therefore, there exists a need to share the load and efficiently utilize the multiple processors to achieve optimal performance of the device.

Figure 3:
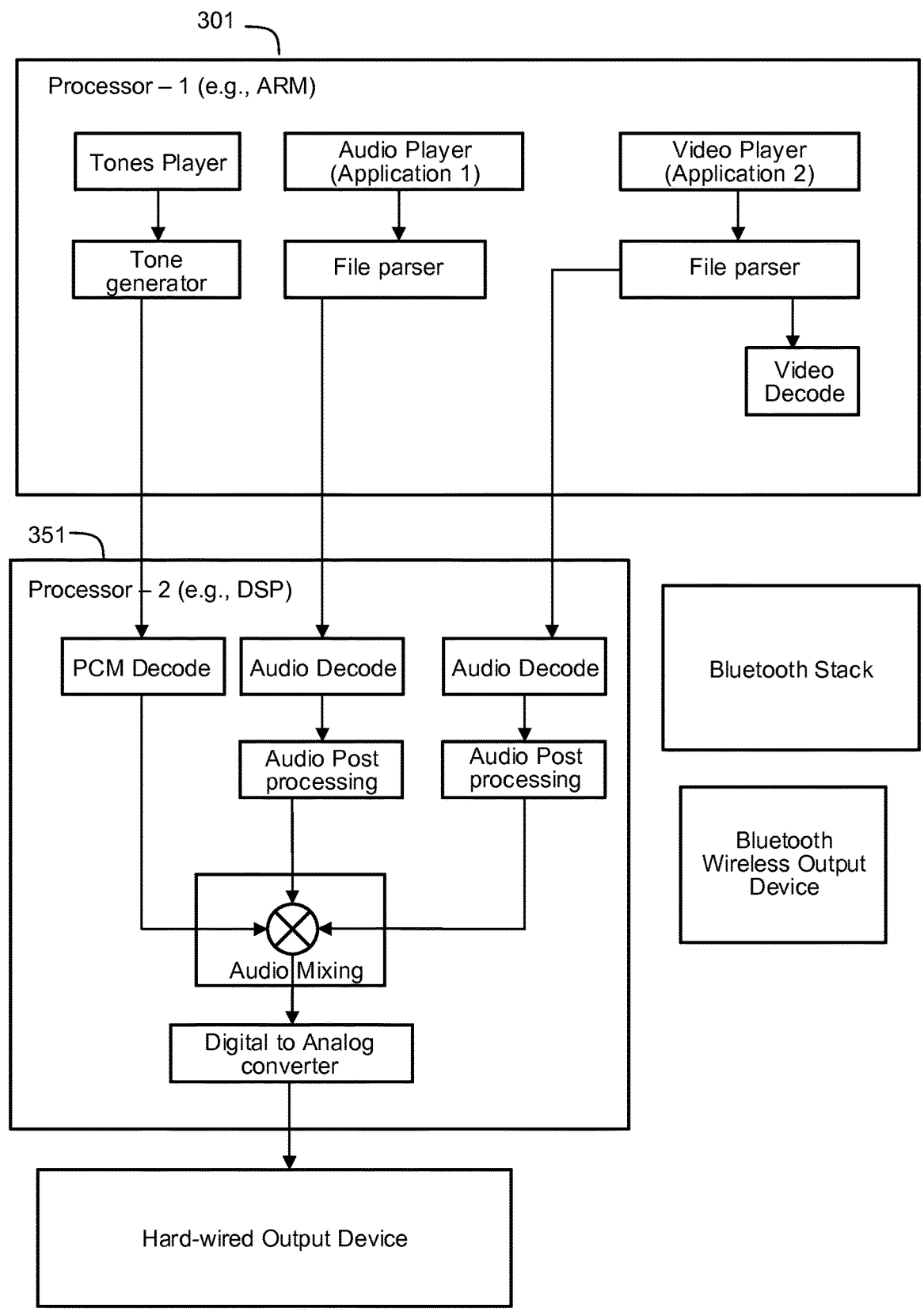
FIG. 3 is a diagram of an audio playback architecture utilizing two processors in accordance with an embodiment of the disclosure.

The architecture depicted in FIG. 3 depicts an architecture for "offloading," otherwise known in the art as "hardware acceleration." This architecture is different from the architecture depicted in FIG. 2 because both audio decoding and post-processing are handled on a second processor 351 (for example, a DSP). This mode is called "offload mode" herein. Offload mode may be used to describe a mode of operation in which certain processing activities are sent to be performed on a different processor for more efficient, or faster operation, even though the processing activity may be performed on another processor For example, in FIG. 3, the first processor 301 may be capable of performing audio decoding and post-processing itself (although such components are not depicted on the first processor 301), but the decoding and post-processing may be "offloaded" to the second processor 351 because it is more robust than the first processor 301. Offload mode may alternatively be referred to as "offloading" or "hardware acceleration," with the term "hardware acceleration" signifying that the use of a piece of hardware (such as a DSP) may increase the overall processing speed of the architecture. In FIG. 3, offloading is especially useful given that the hard-wired output device 360 is directly controlled by the second processor 351.

Figure 4:
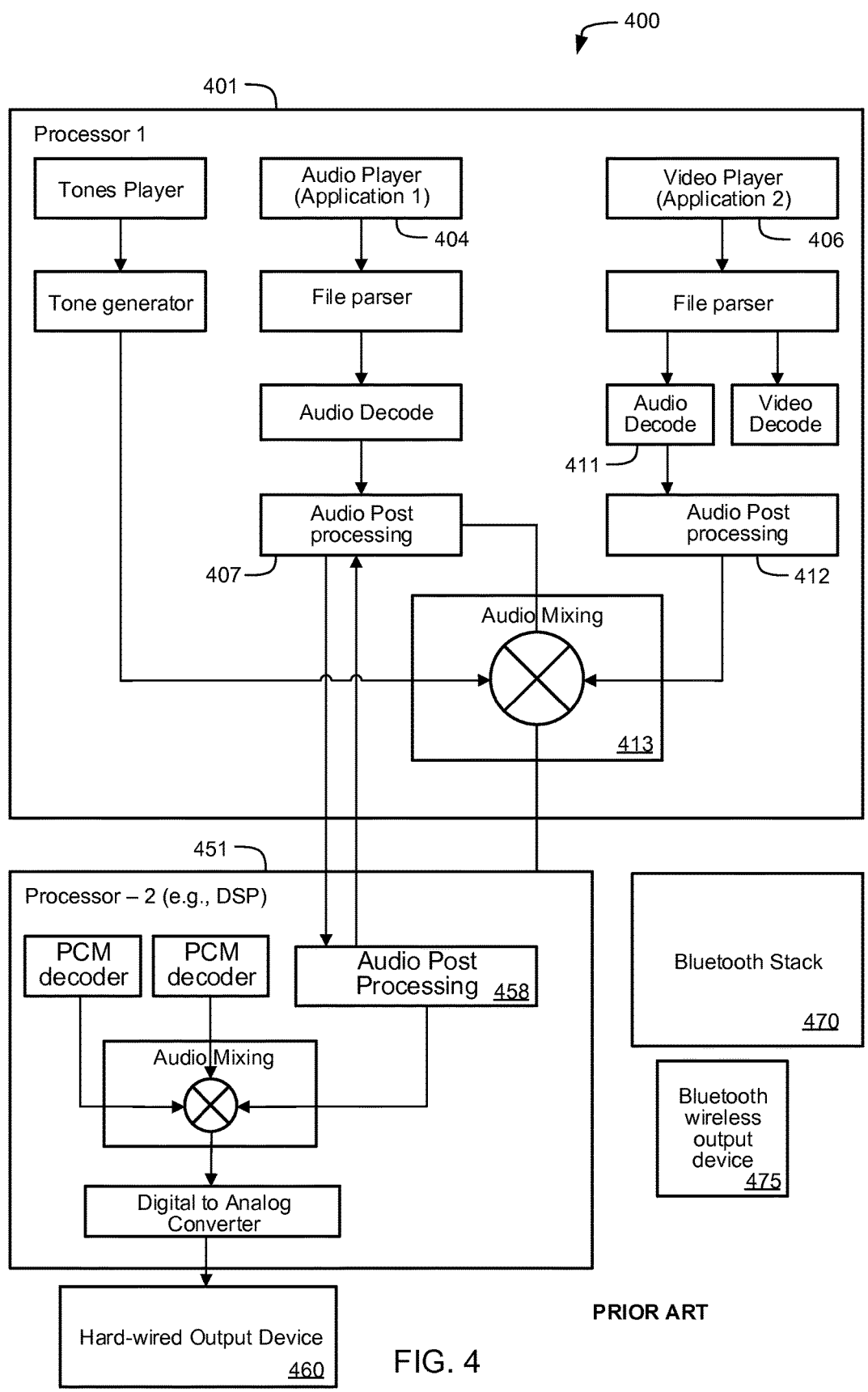
FIG. 4 is another diagram of an audio playback architecture utilizing two processors in accordance with an embodiment of the disclosure.

FIG. 4 depicts an audio playback architecture 400 in accordance with embodiments of the present disclosure that uses hardware acceleration (offload processing) even though output devices are each controlled by only one processor at a time. That is, the hard-wired output device 460 is ultimately controlled by the second processor 451 and the Bluetooth wireless output device 475 is controlled by the first processor 401. In the example depicted, similar to the architecture depicted in FIG. 2, audio is being played out on the Bluetooth wireless output device 475 after being partially processed on the first processor 401. In contrast to the architecture depicted in FIG. 2, though, while the audio output is ultimately played on the Bluetooth wireless output device 475, some of the post-processing is run on the second processor 451. In the example shown, the file from the audio player 404 is parsed and decoded, and then instead of being post-processed on the first processor 401, the file is sent to an accelerated post-processing component 407. This accelerated post-processing component 407 sends control instructions and data comprising decoded PCM to an audio post-processing component 458 on the second processor 451. Once the post-processing takes place on post-processing component 458, the data is sent back to the accelerated post-processing component 407 on the first processor 401, then sent to the audio mixer 413. An advantage of offloading post-processing activities onto the second processor 451 is that the processing resources of the second processor 451 can be used to accelerate the time needed for post-processing by distributing the workload. Offloading can reduce the overall power and time requires for post-processing across the architecture. However, as will be described in further detail presently, sometimes a particular media file requires extensive post-processing effects. The more post-processing effects a file has, the more data communication must take place between the two processors. This heavy data communication between the processors can consume battery power and processing resources.

Figure 5:
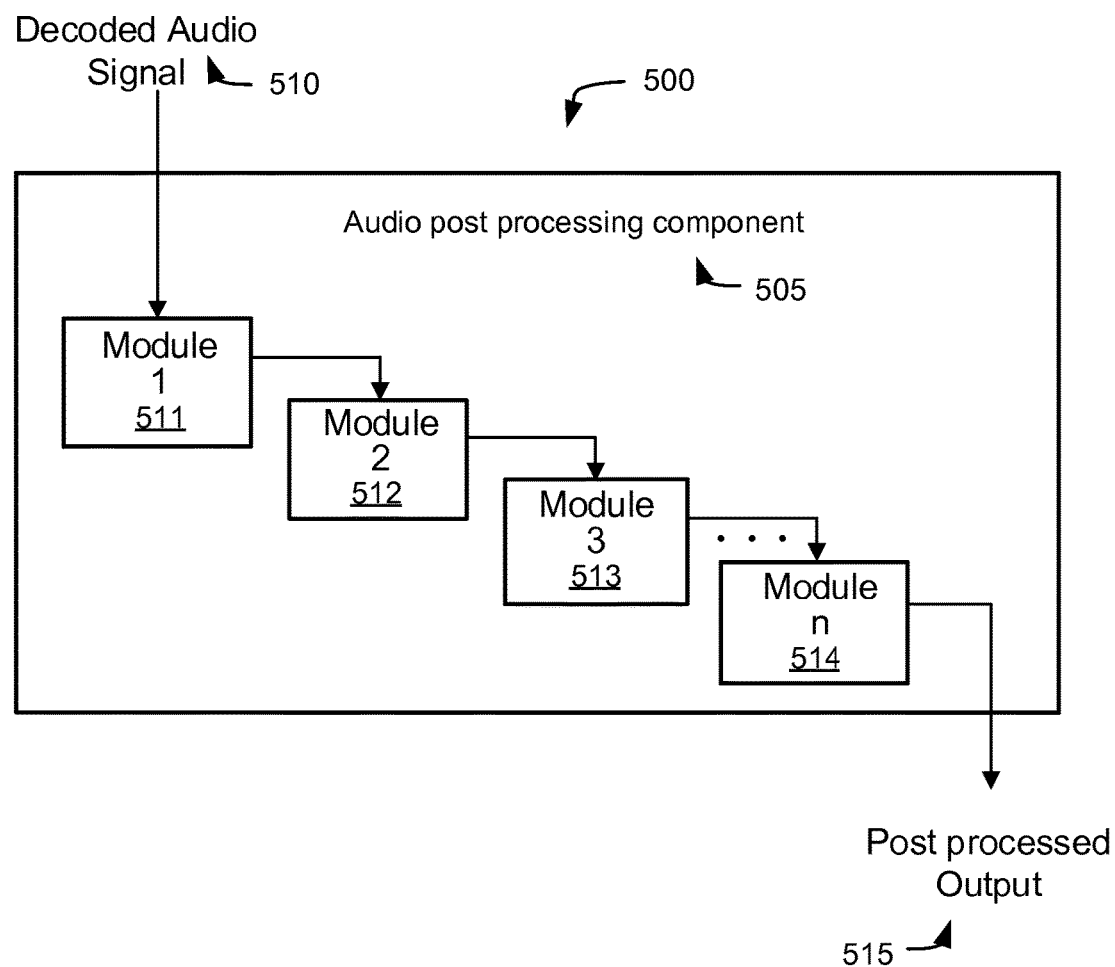
FIG. 5 is a logical block diagram depicting the flow of a decoded audio signal through post-processing modules in accordance with embodiments of the disclosure.

FIG. 5 depicts an audio post-processing chain 500, which may be implemented in, for example, post-processing components 407, 412, or 458 of FIG. 4. As discussed previously, one audio post-processing component can comprise multiple individual processing modules chained together. Each module may be used to create a different audio effect. For example, one module could be used to automatically level the volume of the output, another could be used to remove unwanted noise, and another could be used to shift the pitch of the sound. Those skilled in the art will appreciate that there are at least dozens of types of post-processing modules, and any of them may be implemented in embodiments of the present disclosure. In FIG. 5, the decoded audio signal 510, which came from a decoder (e.g., audio decoder 411 of FIG. 4) serves as input to a first module 511, where the first post-processing takes place. The decoded audio signal 510 may comprise, in many embodiments, decoded pulse code modulated digital signals, which have been referred to throughout this disclosure as PCM, or decoded PCM. These signals are produced as output from decoders, and serve as input to the post-processing components that will be referred to throughout the rest of the disclosure. Additionally, embodiments of this disclosure may apply to decoded audio signals that are not necessarily digital pulse code modulation signals. For clarity and simplicity, the audio signals that undergo post-processing will be referred to herein as "decoded audio signals."

After the decoded audio signal 510 is sent to the first module 511, the post-processed data from the first module 511 is sent to a second module 512, and the process is repeated for however many modules exist in this particular post-processing chain, through an Nth module 514. The post-processed output 515 of the Nth module (i.e., the last module) 514 is sent to the input of the mixer. This post-processing chain may take place entirely within a first processor such as first processor 101 of FIG. 1. In the diagram of FIG. 5, no post-processing is depicted as offloaded to another processor.

Figure 6:
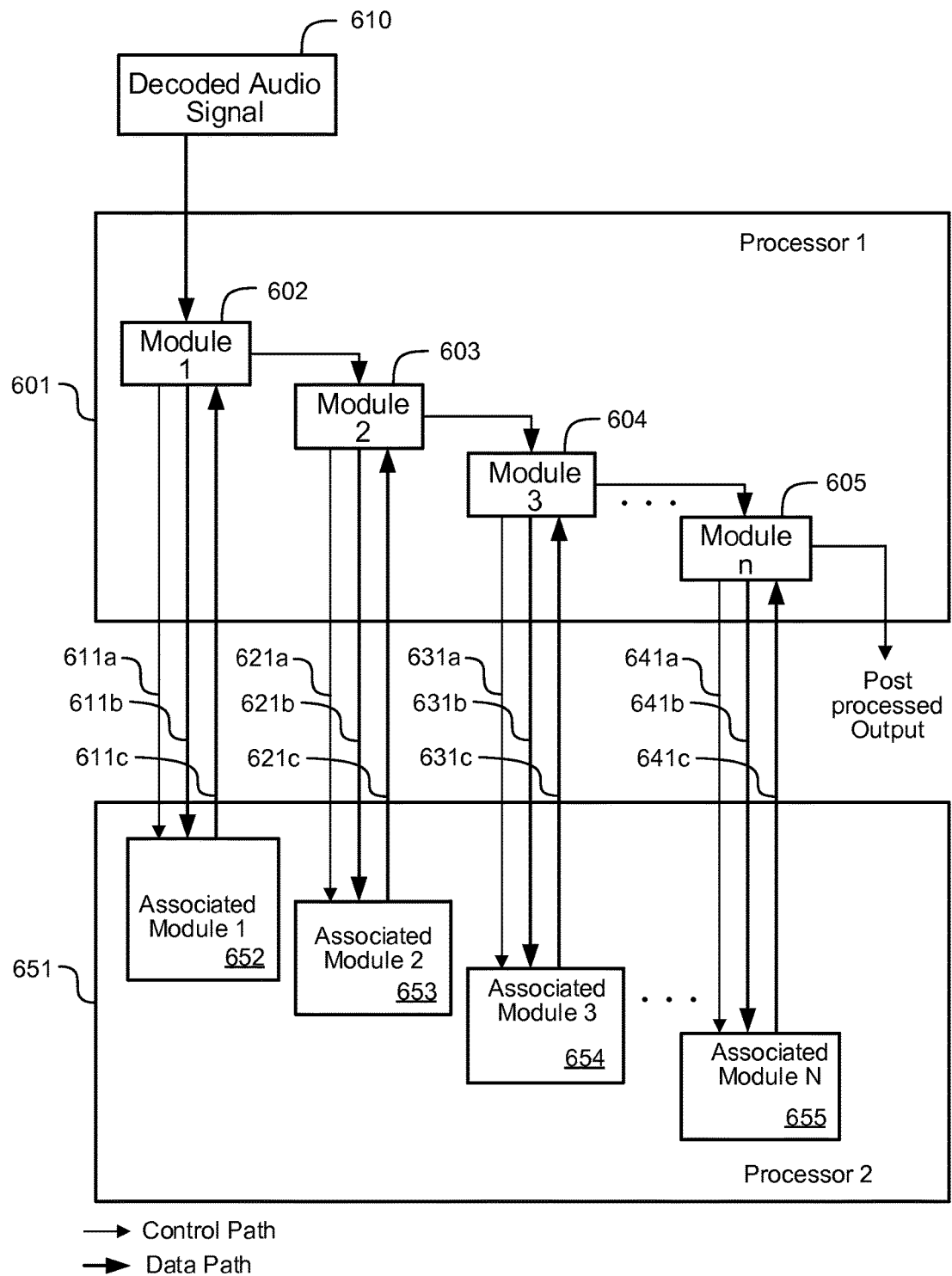
FIG. 6 is a logical block diagram depicting post-processing functions being offloaded to a second processor in accordance with the prior art.

FIG. 6 shows a prior art diagram of hardware acceleration of each module when the playback is rendered on an output device (e.g., the Bluetooth wireless output device 475 of FIG. 4) which is controlled by single processor in a device which comprises multiple processors. In FIG. 6, there is a first processor 601 and a second processor 651. Multiple post-processing modules are depicted in FIG. 6, such as module 1 602 through module N 605 on the first processor 601, and associated module 1 652 through associated module N 655 on the second processor 651. Each of these post-processing modules may exist within an audio post-processing component, such the audio post-processing component 505 depicted in FIG. 5, but a depiction of the audio post-processing component is omitted in FIG. 6 for clarity. In order for post-processing functions to be offloaded to a second processor, for every post-processing module in the first processor 601, there is an associated post-processing module in the second processor 651. In certain audio playback architectures, each module is controlled according to its context from the application. The various control signals sent to the modules will be described in more detail later in the disclosure. In FIG. 6, there exists a control path and a data path between each post-processing module in the first processor 601 and its associated post-processing module in the second processor 651. Throughout the figures, where arrow lines are of different weights, the thinner arrow lines may represent a control path (along which a control signal flows) and the thicker arrow lines may represent a data path (along which data packets flow). Those skilled in the art will appreciate that the control path controls the modules by enabling, disabling, and configuring the modules. For example, though a DSP may have dozens of post-processing modules, sometimes only a few of them will be used at a time for post-processing of a particular audio signal. When the modules are to be used, they may be enabled by the control path. The rest of the modules may be disabled by the control path, which allows the decoded audio signal to bypass those modules. Some modules may be configurable, such as through user input. For example, one module could be a 5-band equalizer. The media player device may have a user interface that allows a user to change the gain of each band at any given time. This input (e.g., the change in gain) from a user would then be passed to the module via the control path. The data path is a separate path that transfers the data of the decoded audio signal to and from each of the processors. An aspect of the present disclosure is that the data path is modified in contrast to the prior art.

Referring still to FIG. 6, the decoded audio signal 610 from a decoder is fed to the first module 602. Typically, to post process the decoded output 610 through the method depicted in FIG. 6, the digital audio signal 610 is sent in the form of individual, sequential buffer packets (not shown), as is known in the art. Those skilled in the art will also appreciate that certain information is sent between, for example, the first module 602 and its first associated module 652. This information includes control information sent via a control path, depicted as a dashed line at 611a, and data packets sent via a data path, depicted as solid lines at 611b and 611c. The data packet flow of an individual buffer of decoded output, therefore, would be a decoded audio signal buffer packet from the decoder (not shown) to the first module 1 602, then along the data path 611b to associated module 652, where it would be post-processed according to associated module 652, then sent back to the first module 602, then sent along the data path 611c to the second module 603. Then, the control information would be sent from the second module 603 along the control path 621a to the second associated module 653. Throughout the disclosure, "decoded audio signals' may be referred to interchangeably as "buffer packets" when describing how the decoded audio signals may be sent between various processors and/or modules. Sending decoded audio signals may comprise sending multiple buffer packets, such as a first, a second, a third, and more buffer packets.

The buffer packet would be sent along the data path 621b from the second module 603 to the second associated module 653, where it would be further post-processed according to the second associated module 653. Then, the buffer packet is sent back to the second module 603, and subsequently send to the third module 604. This process is repeated for each post-processing module necessary for a particular audio file, with control information being sent on control paths 631a and 641a, and buffer packets being sent along data paths 631b, 631c, 641b, and 641c. Each transfer of a buffer packet along a data path between modules takes some time, and the more transfers take place between modules, the more time and power consumption is required. When there are multiple post-processing modules, the resulting delays and power usage can be significant.

FIG. 6 also shows that control information along the control paths 611a, 621a, 631a, and 641a only flow in one direction; that is, the information flows from the modules of the first processor 601 to the associated modules of the second processor 651. The one-way flow of the control information is due to the fact that control of the post-processing is determined by the modules on the first processor 601. For example, the modules on the first processor 601 may send signals along the control paths to enable or disable the associated modules. Additionally, if a user selected particular parameters for particular modules, those signals would also be sent via the control paths from the modules on the first processor 601 to the associated modules on the second processor 651. These control signals may originate from user input received through a user interface, and then be routed through various control interfaces that are known in the art, such as an audio effect interface, a media player interface, or a playback interface. The user interface and control interfaces are not shown in FIG. 6 for simplicity. FIG. 6 shows that typically, control signals and data packets flow from the first processor 601 to the second processor 651 in similar manners, which is from one particular post-processing module to its associated post-processing module.

An aspect of the present disclosure is that by using an "optimized acceleration wrapper," the control paths can be separated from the data paths, and further, the data paths can be consolidated from multiple data paths to a single data path. This particular mode and method of operation is referred to herein as an "optimized acceleration" mode, and various components that implement the method are also referred to herein as "optimized acceleration" components, in order to distinguish from methods and components implemented in prior art types of hardware acceleration.

Figure 7:
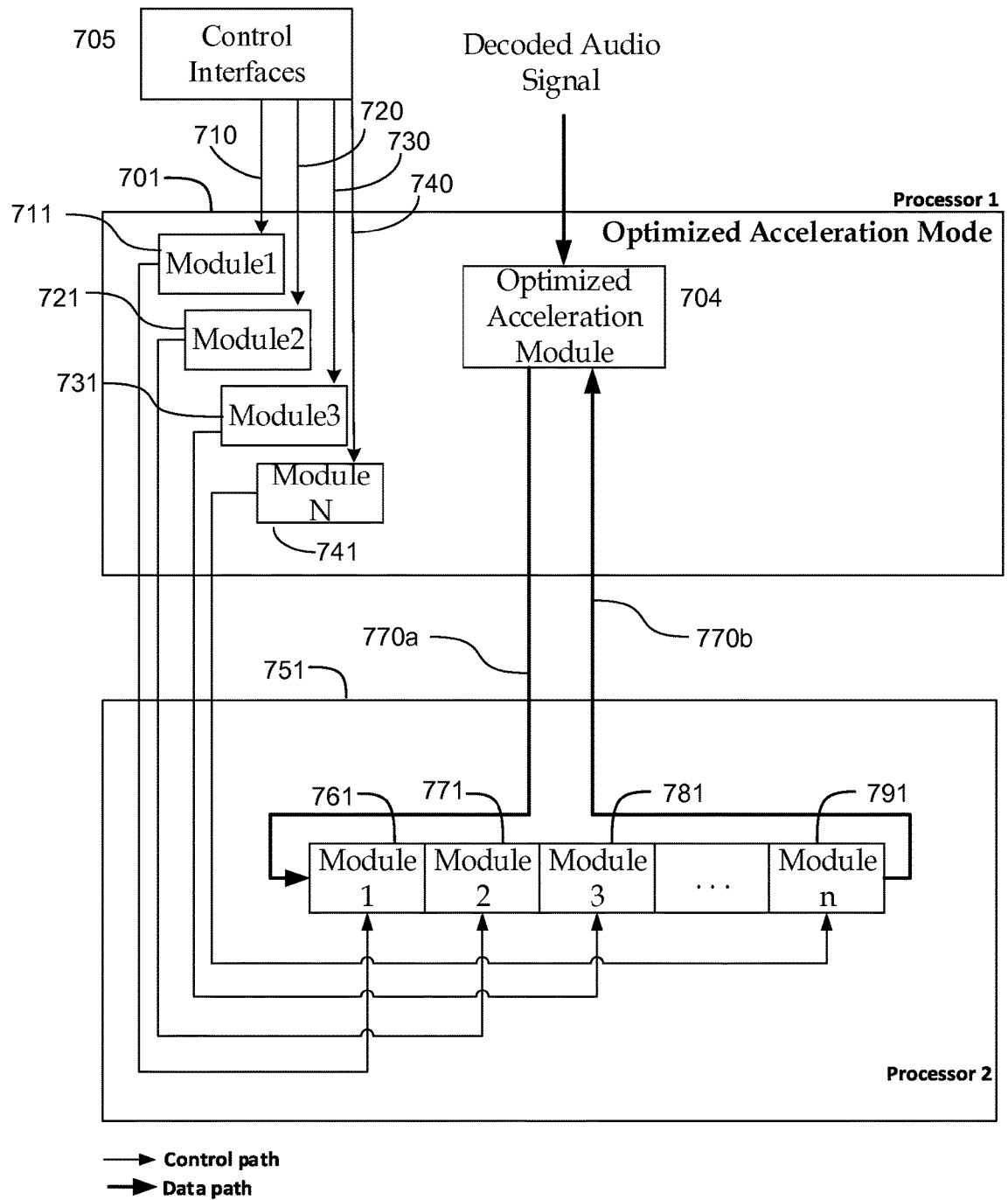
FIG. 7 is a logical block diagram depicting post-processing offloading utilizing an optimized acceleration module in accordance with embodiments of the disclosure.

FIG. 7 depicts an embodiment of the present disclosure in which the control path and the data path are distinctly split, in contrast to their similar pathways shown in FIG. 6. As shown, individual control signals 710, 720, 730, and 740 originate from control interfaces 705 and flow to individual post processing modules 1 through N 711, 721, 731, and 741 on the first processor 701, and then to associated post-processing modules 1 through N 761, 771, 781, and 791 on the second processor 715. As discussed with reference to FIG. 6, the control signals may originate from various user inputs and control interfaces, which are all represented by control interfaces 705 for simplicity. For example, a user may select a particular post-processing effect, such as increasing gain or altering pitch, or may select a playback control, such as play or pause. The user input may send a signal to a control interface, such as an audio effect interface, a media player interface, or a playback interface, which are known in the art. The flow of the control path may be substantially the same as in FIG. 6, though the control interfaces are not shown in FIG. 6. However, in contrast to FIG. 6, the flow of the data path is different. An optimized acceleration module 704 consolidates the data path to reduce the number of transfers of data between the two processors. The optimized acceleration module 704, which is created by the first processor 701 and may be implemented by the first processor 701 itself, acts as a chain that strings all the modules together. Because the optimized acceleration module 704 consolidates the flow of data along one data path, buffer packets of decoded audio signals are sent along a single data path 770a to the first associated module 761 of the second processor 751. The buffer packets of decoded audio signals are then sent through each associated post-processing modules 771, 781, and 791 without being sent back to the modules 721, 731, and 741 of the first processor 701 in between each module. Once the buffer packets of decoded audio signals have been completely post-processed, the buffer packets are sent back along a single return data path 770b to the optimized acceleration module 704. The consolidation of the data path reduces the multiple interactions between the first processor 701 and the second processor 751, which reduces the delays that have been associated with offload processing in the past. It is contemplated that in some embodiments, a single process call from the optimized acceleration module 704 to the second processor 751 may instruct both the sending of a buffer packet along the data path 770a and the return of the buffer packet along the return path 770b.

Figure 8:
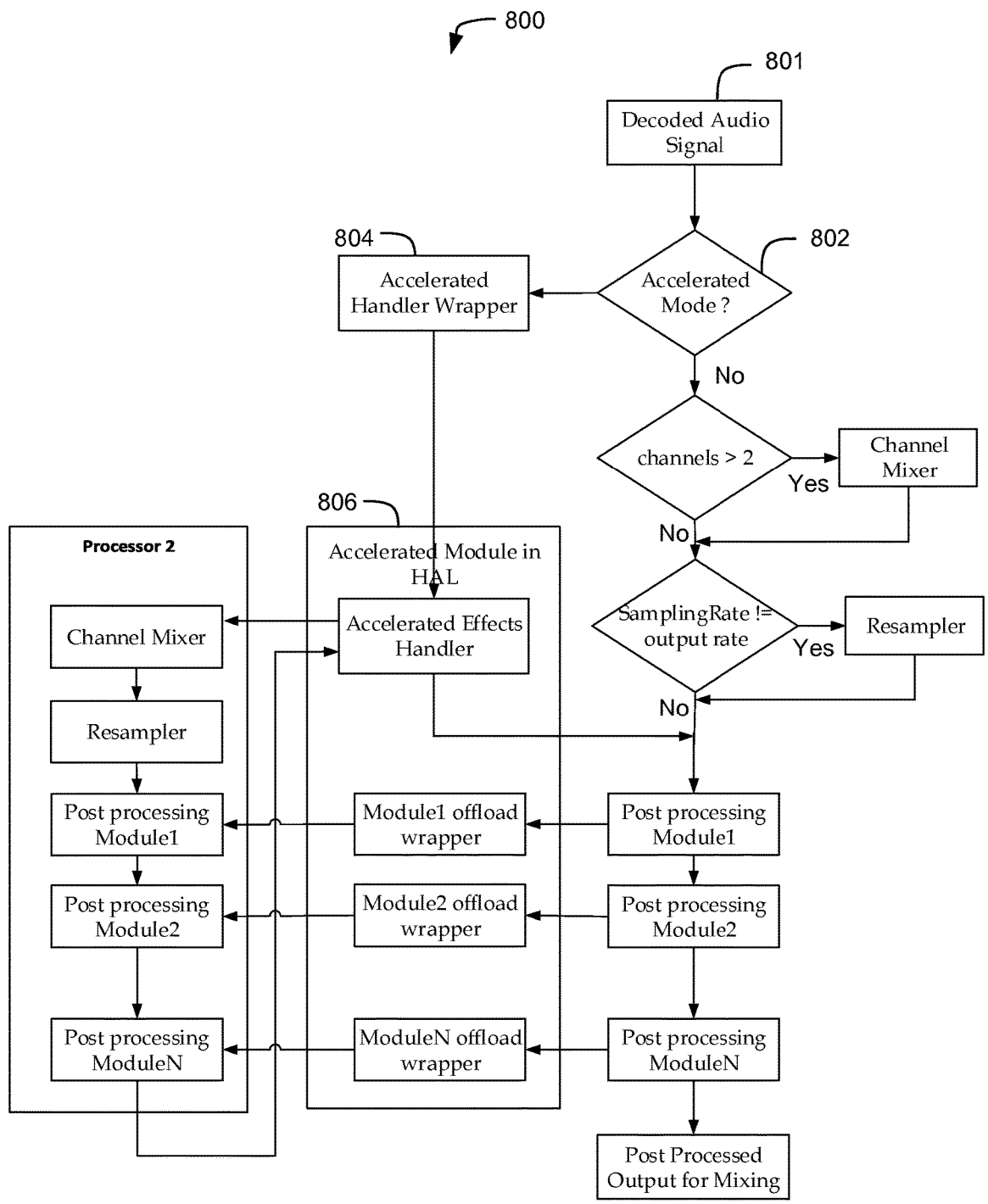
FIG. 8 is a logical block diagram of an audio playback architecture capable of implementing an optimized acceleration mode of post-processing in accordance with embodiments of the disclosure.

Referring to FIG. 8, it is a logical diagram 800 that shows the possible paths through which a decoded audio signal 801 from a decoder could be processed by a device that is capable of implementing the optimized acceleration method of the present disclosure. A first processor 810 is depicted on the right and a second processor 850 is depicted on the left. An optimized acceleration handler wrapper 804 and an optimized acceleration module 806, which will be described in more detail presently, are logically depicted in the middle. It is contemplated that in devices that are capable of performing the optimized acceleration method of this disclosure, there may still be instances in which the optimized acceleration mode may not be utilized; that is, sometimes no offloading to the second processor 850 will occur. When no optimized acceleration occurs, post-processing may take place entirely on the first processor 810. FIG. 8 shows that the decoded audio signal 801 is sent to the first processor 810 and the determination is made at 802 as to whether the decoded audio signal 801 should be processed in an optimized acceleration mode or a standard mode. A number of factors can influence whether the acceleration module is used, including what kind of output device the audio will be ultimately rendered through, and the complexity of the post-processing that is required for a particular file. Another main factor that can influence the usage of the optimized acceleration mode is the capacity of the second processor. That is, some second processors, such as DSPs, may have limitations on how many instances of post processing chains can be handled at once. To differentiate between FIGS. 8, 9, and 10, FIG. 8 depicts the possible routes through which the decoded audio signal 801 could be processed, FIG. 9 highlights the route through which the decoded audio signal is processed in standard mode, and FIG. 10 highlights the route through which the decoded audio signal is processed in the optimized acceleration mode in accordance with the present disclosure.

Figure 9:
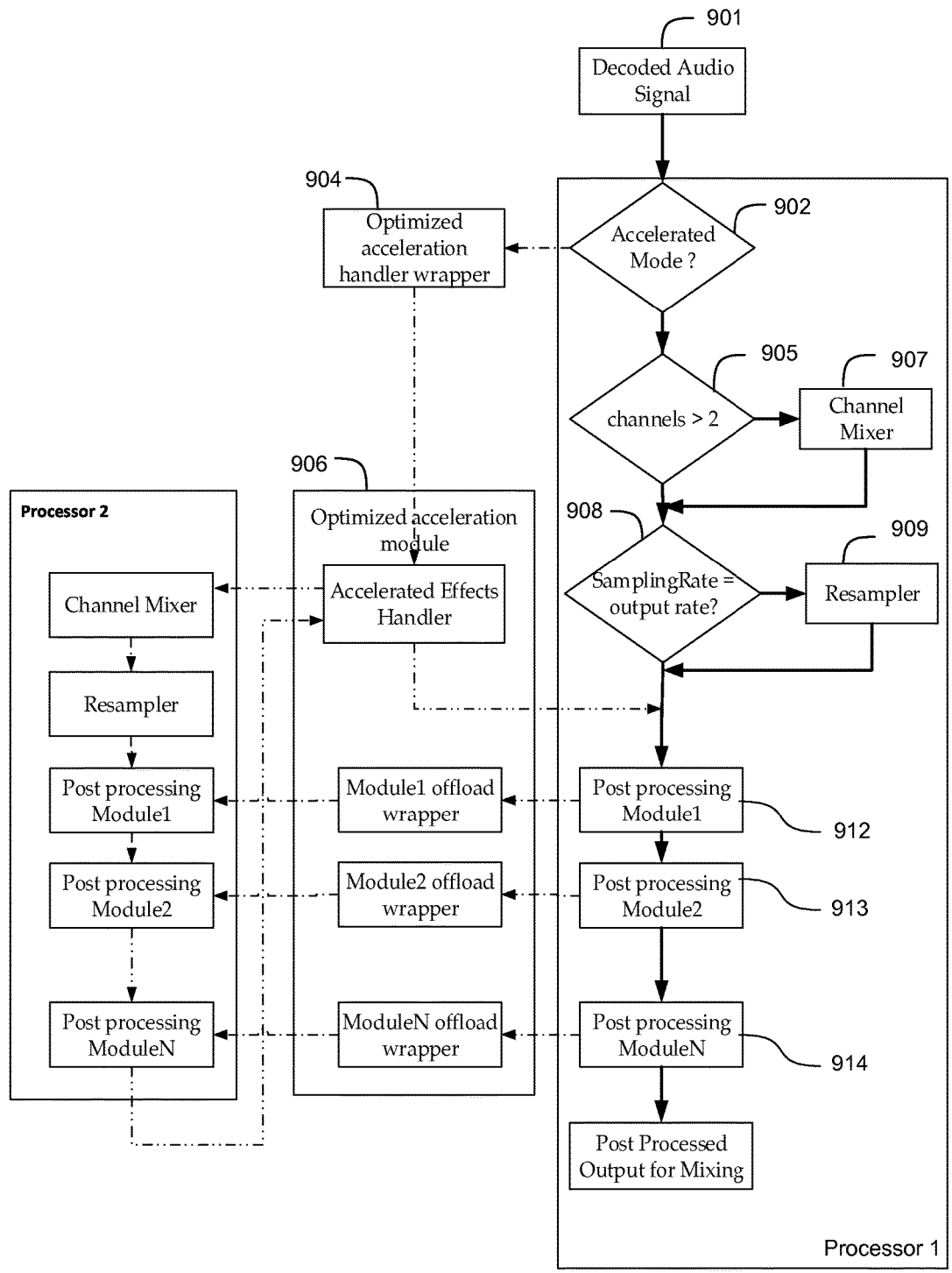
FIG. 9 is a logical block diagram of an audio playback architecture implementing a standard mode of post-processing in accordance with embodiments of the disclosure.

In FIG. 9, the standard processing path for the decoded audio signal 901 is depicted with solid lines and takes place mostly within the first processor 910. First, the decoded audio signal 910 is sent from the decoder (not shown) to the first processor 910. Within the first processor 910, a determination is made at 902 that the post-processing will take place in a standard mode. The rate at which buffer packets of the decoded audio signal 901 are sent from the decoder to the first processor 910 may be determined by a buffer provider (not shown) as is known in the art. The standard mode of post-processing may require channel mixing and/or resampling, because the decoded audio signal 901 may be sent at an original channel mode and sample rate, but the post-processed output may require a different channel mode and/or sample rate. Therefore, a determination may be made at 905 as to whether there are more than two channels or channel modes in the signal; if so, the decoded audio signal may be sent to a channel mixer 907. Then, another determination may be made as to whether the original sampling rate is different from the output sample rate; if so, the decoded audio signal 901 may be sent to a resampler 909. Once the decoded audio signal 901 has been channel mixed and resampled as necessary, it is post-processed according to each post-processing module 912, 913, and 914.

Figure 10:
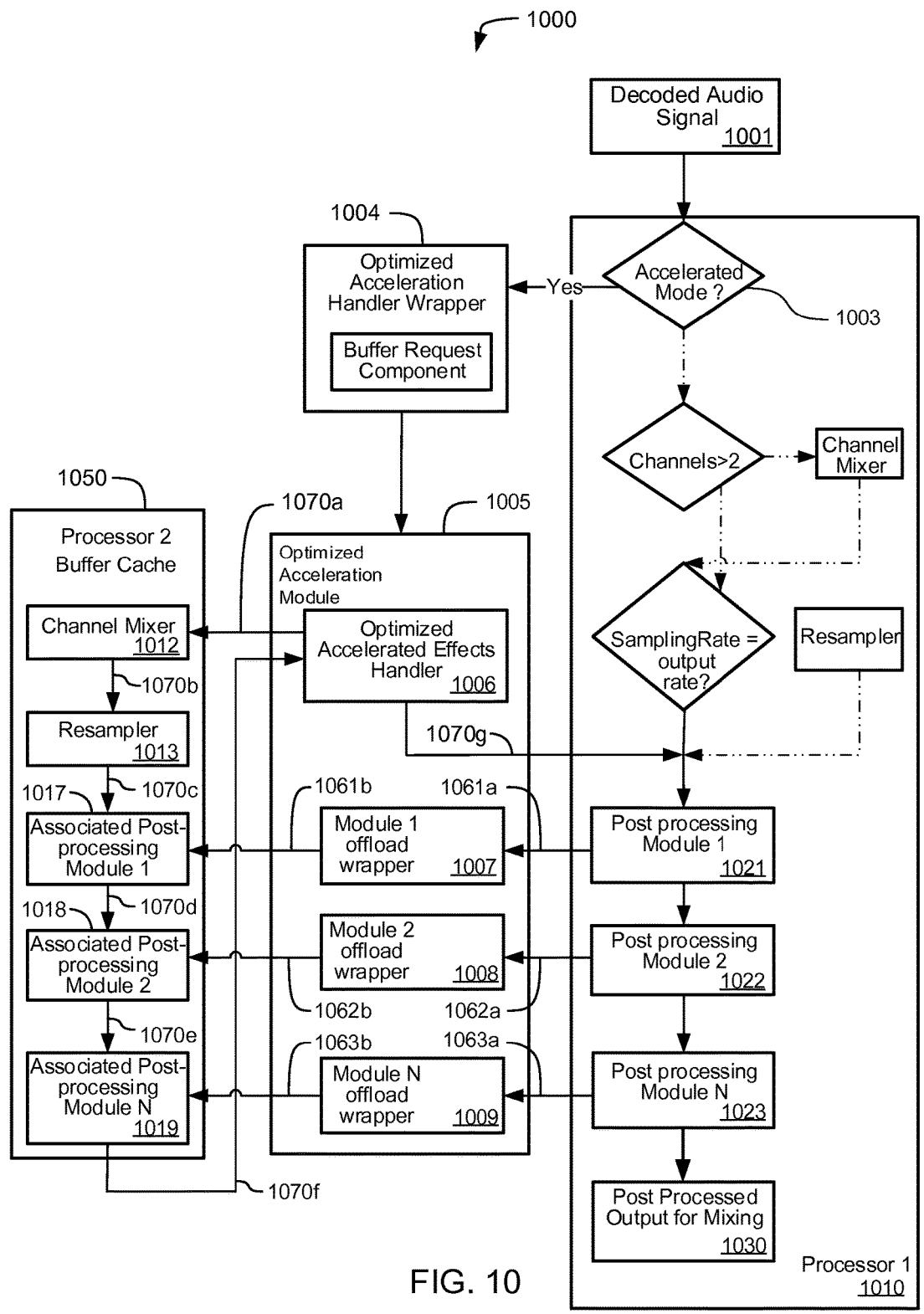
FIG. 10 is a logical block diagram of an audio playback architecture implementing an optimized accelerated mode of post-processing in accordance with embodiments of the disclosure.

Referring next to FIG. 10, it is a logical block diagram showing the path that the decoded audio signal 1001 may go through in an optimized acceleration mode of operation 1000 in accordance with an embodiment of the present disclosure. Components that may execute the optimized acceleration method may be implemented by an optimized acceleration handler wrapper 1004, and an optimized acceleration module 1005, which includes an optimized accelerated effects handler 1006 and offload wrappers 1007, 1008, and 1009 for each module associated with the offloaded module.

In some embodiments, the optimized acceleration handler wrapper 1004 may serve to identify to the first processor 1010 and the second processor 1050 that the optimized accelerated mode will be utilized for a particular audio file. Additionally, the optimized acceleration handler wrapper 1004 may communicate with the decoder via a buffer request component 1015 to request additional buffer packets of decoded PCM signals, as will be described more fully later in this disclosure. Though the optimized acceleration handler wrapper 1004 is depicted as a separate component from the first processor 1010, in many embodiments, the optimized acceleration handler wrapper 1004 may be implemented as a part of the first processor 1010. Additionally, the optimized acceleration handler wrapper 1004 may function to check if the second processor 1050 can support the optimized acceleration mode for a given playback session, and if so, to initiate and handle the consolidation of the data path.

In the prior art, decoded audio signals that are produced as output from a decoder are typically buffered by a buffer provider in order to manage the amount of data sent to an audio post-processing unit. In embodiments of the present disclosure, the optimized accelerated handler wrapper 1004 overrides any existing decoder output data buffer provider and instead, makes a request for buffers via the buffer request component 1015. The number of buffers, or alternatively, the size of buffers, requested by the optimized accelerated handler wrapped based on the desired amount of data to handle the latencies and frame boundary requirements in the second processor. In other words, the second processor 1050 may require more data than typically provided by the buffer provider because of any extra time required for the first processor 1010 to offload the post-processing tasks to the second processor 1050. The additional buffer may also reduce delays caused by the frame boundary requirements of the second processor, which may occur, for example, when video files are post-processed.

The optimized acceleration handler wrapper 1004 may create an accelerated effects module 1005 for data communication between the first processor 1010 and the second processor 1050. Each post-processing module 1021, 1022, and 1023 in the first processor 1010 may have an associated wrapper through which control information may be communicated to the second processor 1050, on which the offload processing is occurring. These wrappers are depicted within the optimized acceleration module 1005 as module 1 offload wrapper 1007, module 2 offload wrapper 1008, and module N offload wrapper 1009. In some, but not all embodiments, the optimized acceleration module 1005 itself may create instances of module offload wrappers 1007, 1008, and 1009 in order to create a control path of communication from the post-processing modules 1021, 1022, and 1023 on the first processor 1010 to the associated modules 1017, 1018, and 1019 on the second processor 1050. The control data sent from the post-processing modules 1021, 1022, and 1023 may include, for example, tuning parameters selected by a user. The paths of the control data between the various modules from the first processor 1010 to the optimized acceleration module 1005 to the second processor 1050 are represented by thin arrows 1061a, 1061b, 1062a, 1062b, 1063a, and 1063b. Further, in the optimized acceleration mode, the decoded audio signal 1001 is sent through the optimized acceleration wrapper 1004 to the optimized accelerated effects handler 1006 in the optimized acceleration module 1005 for the purpose of channel mixing at the channel mixer 1012, and resampling at the resampler 1013 within the second processor 1050.

As shown, an optimized accelerated effects handler 1006 receives the decoded audio signal 1001 through the optimized acceleration handler wrapper 1004 and routes the data that is being offloaded onto the second processor 1050. One reason that a channel mixer 1012 and a resampler 1013 are depicted and utilized in the second processor 1050 is because the decoder output data 1001 may be transferred for processing at its native sample rate and channel mode, and if there were no resampling or channel mixing at the second processor 1050, the output at the end of the post-processing chain 1017-1019 may be at a different sample rate and channel mode than other playback streams at the mixer 1030 at the first processor 1010. A different sample rate and channel mode can cause a mismatch in the buffering speed or the size of the buffer. If there are two different sample rates, the relationship between the two is known as a fractional sample rate and increased latency can occur when there is a fractional sample rate. The resampling, therefore, can address any delays that might be cause by a fractional sample rate. Additionally, delays can be caused by the time it takes for a post-processed buffer packet to be transferred from the offloaded processor back to the first processor that controls the output device. To address these delays, an aspect of the disclosure is that the buffer request component 1015 may request a second data buffer either contemporaneously, or immediately after the first buffer is transferred from the decoder (not shown) and feed the two buffers for processing to the second processor 1050. While the first buffer packet is being processed, the second buffer packet may be temporarily stored in the buffer cache 1011 until it is ready to be post-processed. After the first buffer packet has been post-processed, the second buffer packet that was stored in the buffer cache 1011 may begin to be post-processed. While the second buffer is being processed by second processor 1050, the first buffer that has been successfully post-processed by the second processor 1050 is sent back to the optimized accelerated effects handler 1006 so that it can be rendered to the output device. As a result, by the time the first buffer packet has been transferred back to the first processor 1010 and has finished being rendered, the second buffer packet may also have been transferred back to the first processor 1010 and may begin to be rendered. By receiving and storing a second buffer packet right away, the second processor 1050 may begin post-processing immediately, which reduces delays normally caused by offloading in the first place. The timing of the buffer packet transfer, post-processing, and rendering will be explained further with reference to FIG. 11.

Still referring to FIG. 10, an aspect of the disclosure is that the optimized acceleration module 1005 may have an optimized accelerated effects handler 1006, which may be responsible for sending the decoded audio signal 1001 along a consolidated, single data path from the first processor 1010 to the second processor 1050, then receiving the post-processed decoded audio back from the second processor 1050 along a consolidated, single data path as well. The data path is represented by thick arrows 1070a, 1070b, 1070c, etc. to show that the transfer of the decoded audio 1001 (in individual buffer packets) moves from the optimized accelerated effects handler 1006 to the channel mixer 1012, then to the resampler 1013, then to the associated post-processing modules 1017, 1018, and 1019. After the decoded audio signal has been post-processed at the last associated post-processing module 1019, the signal has been completely post-processed and now contains all the post-processing effects required. The data path 1070f shows that this buffer packet is sent back to the optimized accelerated effects handler 1006. Then, it is sent along the data path 1070g to the first processor. Although the data path is depicted as going through post-processing modules 1021, 1022, and 1023, no further post-processing needs to take place there. The buffer packet can now be sent as output for mixing at 1030 to ultimately be converted to analog and rendered on an output device that is controlled by the first processor 1010, as depicted in, for example, FIG. 4

Figure 11:
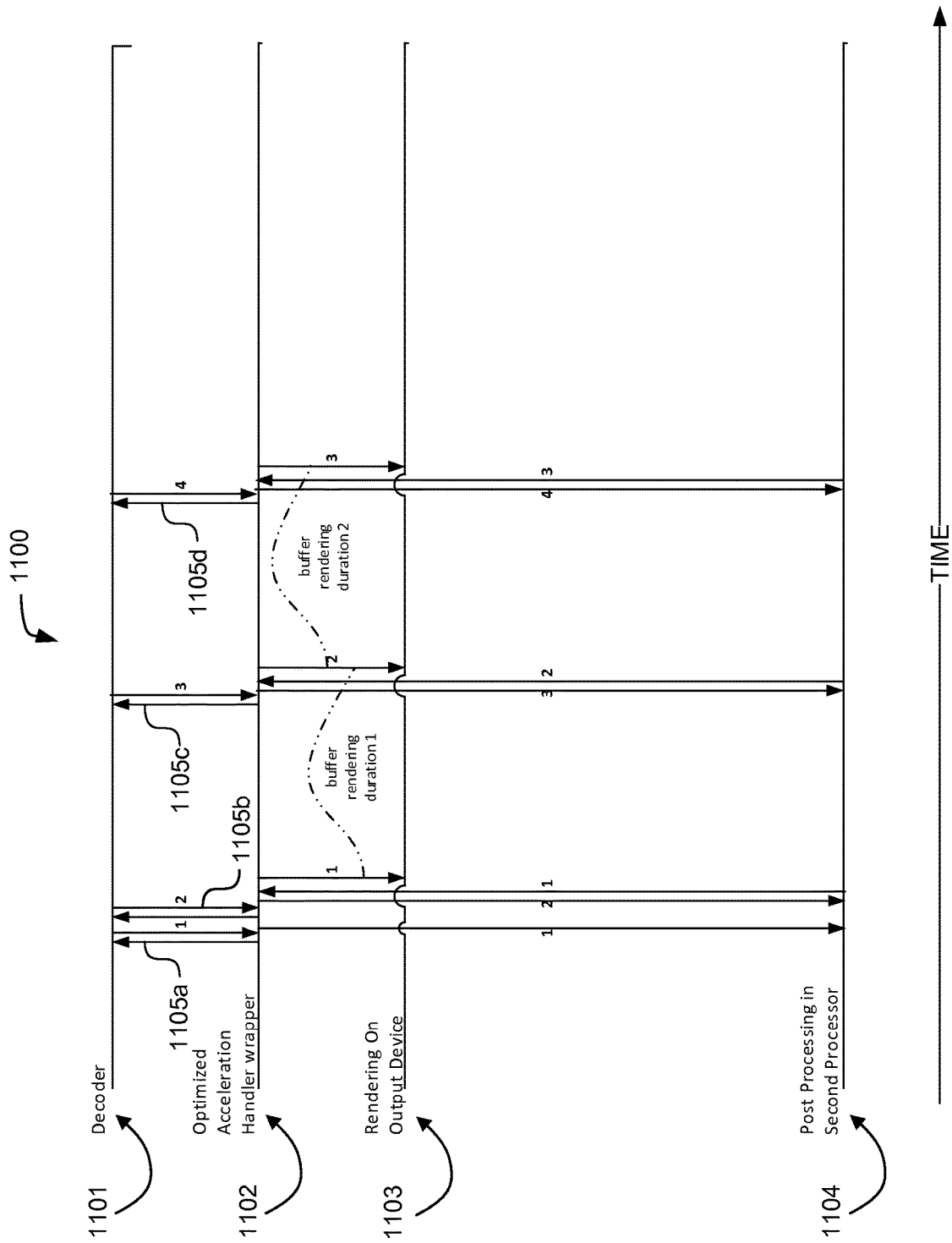
FIG. 11 is a timeline depicting the transfer of buffer packets of decoded audio signals in accordance with embodiments of the disclosure.

FIG. 11 is a timing diagram that depicts when buffers are sent from the optimized accelerated handler wrapper 1006 to the second processor 1050 in comparison to when the buffer has been post-processed and sent back to the accelerated handler 1006 and subsequently rendered. The figure shows requests 1105*a*, 1105*b*, 1105*c*, and 1105*d* being sent from the optimized acceleration handler wrapper 1102 (specifically, from buffer request component 1015) to the decoder 1101. Additional hardware components including output device 1103 and second processor 1104 are depicted, and buffer packets 1, 2, 3, and 4 are depicted as being transferred between the various hardware components. Following the requests 1105*a*-1105*d* and the buffer packets 1-4 chronologically from left to right, first, a first request 1105*a* is sent from the optimized acceleration handler wrapper 1102 to the decoder 1101. In response, a first buffer packet 1 is sent from the decoder to the optimized acceleration handler wrapper 1102. The first buffer packet 1 may then be sent immediately from the optimized acceleration handler wrapper 1102 to the second processor 1104 for post-processing. As depicted, a second request 1105*b* may be sent from the optimized acceleration handler wrapper 1102 to the decoder 1101, and the second buffer packet 2 may be sent from the decoder 1101 to the optimized acceleration handler wrapper 1102 and on to the second processor 1104 before the first buffer packet 1 has been fully post-processed and sent back to the optimized acceleration handler wrapper 1102. Then, the buffer packet 1 is sent from the optimized acceleration handler wrapper 1102 to the output device 1103 for rendering.

An aspect of the disclosure is that the second buffer packet 2 may be post-processed while the buffer packet 1 is being rendered on the output device 1103. The time it takes to render buffer packet 1 is depicted as buffer rendering duration 1. Before the buffer rendering duration 1 is over, a third buffer request 1105*c* is sent from the optimized acceleration handler wrapper 1102 to the decoder 1101, and the third buffer packet 3 is subsequently sent from the decoder 1101, to the optimized acceleration handler wrapper 1102 and on to the second processor 1104. Then, the second buffer packet 2, which has been post-processed, may be sent back to the optimized acceleration handler wrapper 1102, also before the buffer duration 1 has ended. The second buffer packet 2 can then be rendered immediately after the buffer rendering duration 1 has ended, so that there are no latencies in playback. A similar order of requests, transfers, processing, and playback takes place with respect to buffer packets 3 and 4. An aspect of the disclosure is that buffer packets 1, 2, 3, and 4 are all sent along a single data path, as depicted in FIGS. 4 and 10. It is contemplated that each transfer of a buffer packet to and from the optimized acceleration handler wrapper 1102 and the second processor 1104 takes some time, and that the post-processing itself takes some time. The time periods shown in FIG. 11 are not necessarily to scale. For example, the time period for post-processing of buffer packet 1 is depicted as shorter than the time period for post-processing of buffer packet 2, but the post-processing of buffer packet 2 is not necessarily longer. It is contemplated that the post-processing of buffer packet 2 may actually take less time than the buffer rendering duration 1. Rather, the timeline just depicts the order in which buffer packets are sent and processed in relation to each other. For example, when buffer packet 3 is sent from the optimized acceleration handler wrapper 1102 to the second processor 1104, and buffer packet 2 is subsequently sent from the second processor 1104 to the optimized acceleration handler wrapper 1102, this depiction is meant to show that only one buffer packet (buffer packet 3) is necessary to be cached and/or post-processed prior to the buffer packet 2 being sent back for rendering. As described with reference to FIG. 10, a later-sent buffer packet may be stored in the buffer cache 1011 while another, previously-sent buffer packet is being processed, and the cached buffer packet may begin to be processed as soon as the previously-sent buffer packet has been post-processed. Therefore, later-sent buffer packets may be described as being either cached or processed depending on where the previously-sent buffer packets is. The fact that only one buffer packet (e.g., buffer packet 3) needs to be cached and/or processed while another buffer packet (e.g., buffer packet 2) is being sent back to the optimized acceleration handler wrapper 1102, is an advantage of the single data path, as will be described in further detail presently.

The buffer packets 1, 2, 3, and 4 in FIG. 11 are all sent along single data paths, even though there are multiple post-processing modules being used at the second processor 1104. For example, in the time between when buffer packet 1 is sent to the second processor 1104 and when it is sent from the second processor 1104, the buffer packet was processed through multiple post-processing modules.

It is useful to compare the performance of aspects of the present disclosure to the performance of the prior art hardware acceleration method as depicted in FIG. 6. In the prior art, offloading post-processing to a second post-processor would introduce delays due to the time it would take to transfer data packets (via the data paths) back and forth between the two processors, and the more post-processing modules were involved, the more times data packets would have to be transferred between the processors. In contrast, embodiments of the present disclosure eliminate the multiple transfers of one buffer packet during a particular post-processing chain. Therefore, only the transfer of a buffer packet via the data path into the start of the post-processing chain and the transfer of that buffer packet back via the data path to the first processor at the end of the post-processing chain. There may still be some latency associated with the transfer of a single buffer packet to the beginning of the post-processing chain and from the end of the post-processing chain. However, this latency is far reduced compared to the prior art. For example, if there were 10 post processing modules, the prior art method of transferring back and forth between the processors for each module would be ten times the amount of latency as the method of the present disclosure. That is, even when there are 10 post processing modules in an embodiment of the present disclosure, there is only one transfer to and one transfer from the second processor. Another aspect of the present disclosure is that the latency of one buffer packet transfer may be mitigated by requesting one additional cached buffer. For example, even if there are 10 post-processing modules, one additional cached buffer packet may account for the latency associated with post-processing a previously sent buffer packet and sending it back to the first processor. FIG. 11 illustrates one additional buffer being sent to the second processor 1104 and either cached or post-processed while the previous buffer is being sent back to the optimized acceleration handler wrapper 1102.

Figure 12:
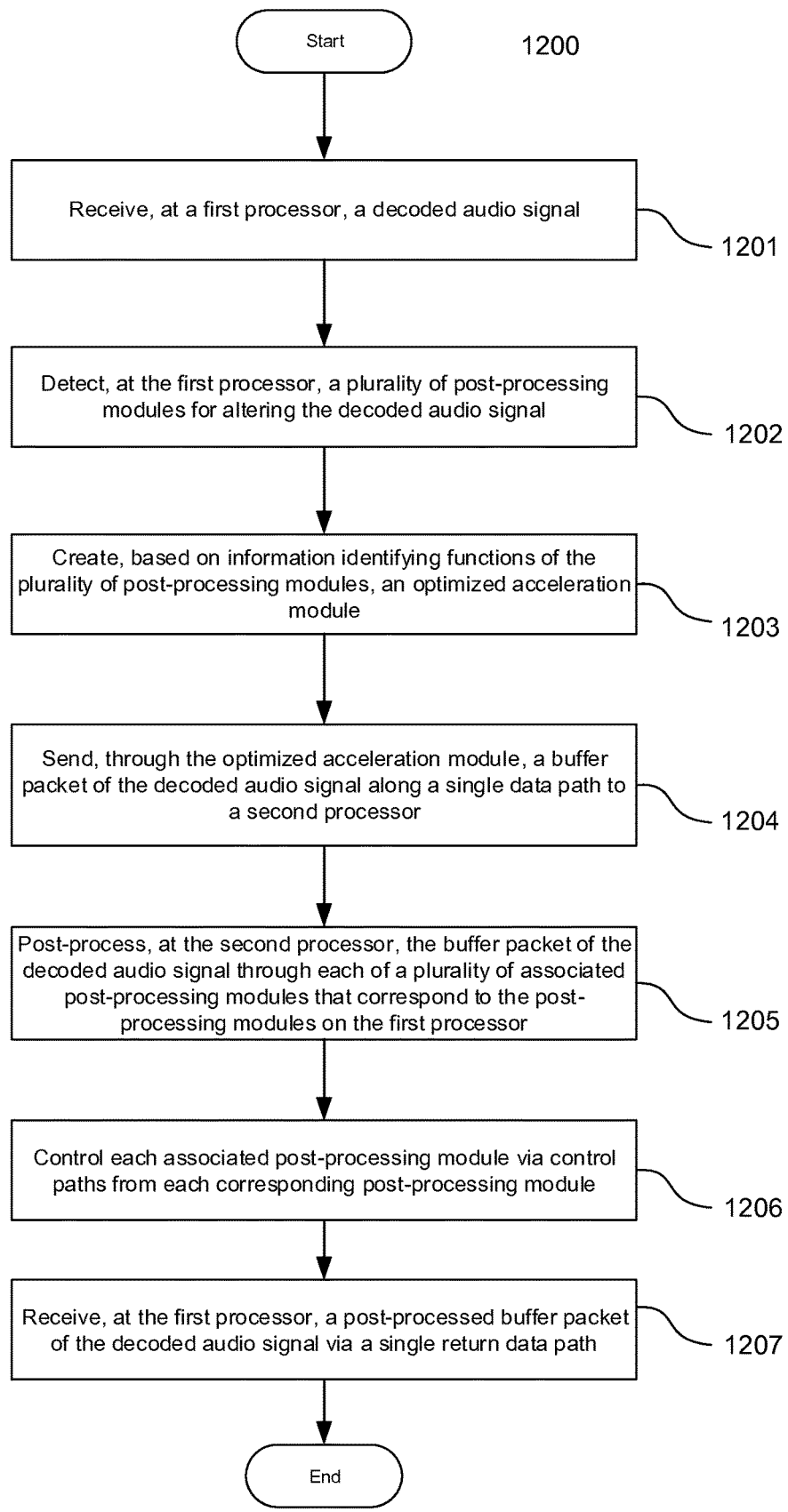
FIG. 12 is a flowchart which may be traversed to depict a method for audio post-processing in accordance with embodiments of the present disclosure.

FIG. 12 is a flowchart which may be traversed to perform a method 1200 for audio post-processing according to embodiments of the present disclosure. Simultaneous reference may be made to components in FIG. 10 that may be used to perform various steps of the method 1200. First, at step 1201, the method may comprise, receiving, at a first processor 1010, a decoded audio signal 1001. Then, at step 1202, the method may comprise detecting, at the first processor 1010, a plurality of post-processing modules 1021, 1022, and 1023, for altering the decoded audio signal.

Next, at step 1203, the method may comprise creating, based on information identifying functions of the plurality of post-processing modules 1021, 1022, and 1023, an optimized acceleration module 1005. Then at step 1204, the method may comprise sending, through the optimized acceleration module 1005, a buffer packet of the decoded audio signal 1001 to a second processor 1050. After that, at step 1205, the method may comprise post-processing, at the second processor 1050, the buffer packet of the decoded audio signal 1001 through each of a plurality of associated post-processing modules 1017, 1018, and 1019 that correspond to the post-processing modules 1021, 1022, and 1023 on the first processor 1010. The method may further comprise, at step 1206, controlling each associated post-processing module 1017, 1018, and 1019 via control paths 1061*a*/1061*b*, 1062*a*/1062*b*, and 1063*a*/1063*b*, from each corresponding post-processing module 1021, 1022, and 1023. Finally, the method may comprise, at step 1207, receiving, at the first processor 1010, the post-processed buffer packet of the decoded audio signal via a single return data path 1070*f*.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for audio post-processing, the method comprising:
   receiving, at a first processor, a decoded audio signal;
   detecting, at the first processor, a plurality of post-processing modules for altering the decoded audio signal;
   creating, based on information identifying functions of the plurality of post-processing modules, an optimized acceleration module;
   sending, through the optimized acceleration module, a buffer packet of the decoded audio signal along a single data path to a second processor;
   post-processing, at the second processor, the buffer packet of the decoded audio signal through each of a plurality of associated post-processing modules that correspond to the post-processing modules on the first processor;
   controlling each associated post-processing module via control paths from each corresponding post-processing module;
   receiving, at the first processor, a post-processed buffer packet of the decoded audio signal via a single return data path.

2. The method of claim 1, wherein:
   creating an optimized acceleration module comprises deriving an offload wrapper for each of the post-processing modules; and
   controlling each of the associated post-processing module via the control paths comprises sending control signals from the post-processing modules, through the offload wrappers, and to the associated post-processing modules.

3. The method of claim 1, further comprising:
   rendering the post-processed buffer packet of the decoded audio signal on an audio output device that is controlled by the first processor and not controlled by the second processor.

4. The method of claim 1, wherein the buffer packet is a first buffer packet, and further comprising:
   sending a second buffer packet of the decoded audio signal to the second processor before the first buffer packet is rendered; and
   storing the second buffer packet in a cache on the second processor while the first buffer packet is being post-processed on the second processor.

5. The method of claim 1, wherein the decoded audio signal is generated from one of a video file, an audio file, and a game file.

6. The method of claim 1, further comprising:
channel mixing the buffer packet of the decoded audio signal, and
resampling the buffer packet of the decoded audio signal.

7. A media player device comprising:
a first processor configured with a plurality of post-processing modules to alter decoded audio signals,
a second processor configured with a plurality of associated post-processing modules that correspond with the plurality of post-processing modules from the first processor,
an optimized acceleration module configured to transfer a buffer packet of a decoded audio signal from the first processor to the second processor via a single data path, and to receive a post-processed buffer packet of the decoded audio signal from the second processor back to the first processor via a single return data path, and is further configured to utilize an offload wrapper for each of the post-processing modules to communicate information from each of the post-processing modules to each of the associated post-processing modules, and
an audio output device controlled by the first processor and configured to render the post-processed buffer packet of the decoded audio signal.

8. The media player device of claim 7, wherein:
the audio output device is not controlled by the second processor.

9. The media player device of claim 7, wherein the buffer packet is a first buffer packet, and wherein:
the first processor is further configured to send a second buffer packet of the decoded audio signal to the second processor before the first buffer packet is rendered; and
the second processor is further configured to store the second buffer packet in a cache on the second processor before the first buffer packet is rendered.

10. The media player device of claim 7, wherein the decoded audio signal is generated from one of a video file, an audio file, and a game file.

11. The media player device of claim 7, wherein;
the second processor further comprises a channel mixing component and a resampling component.

12. The media player device of claim 7, wherein;
the optimized acceleration module is further configured to transfer a buffer packet of a decoded audio signal from the first processor to the second processor via a single data path, and to receive a post-processed buffer packet of the decoded audio signal from the second processor back to the first processor via a single return data path via a single process call from the optimized acceleration module.

13. A non-transitory, tangible computer readable storage medium, encoded with processor readable instructions to perform a method for audio post-processing, the method comprising:
receiving, at a first processor, a decoded audio signal;
detecting, at the first processor, a plurality of post-processing modules for altering the decoded audio signal,
creating, based on information identifying functions of the plurality of post-processing modules, an optimized acceleration module;
sending, through the optimized acceleration module, a buffer packet of the decoded audio signal along a single data path to a second processor;
post-processing, at the second processor, the buffer packet of the decoded audio signal through each of a plurality of associated post-processing modules that correspond to the post-processing modules on the first processor;
controlling each associated post-processing module via control paths from each corresponding post-processing module;
receiving, at the first processor, a post-processed buffer packet of the decoded audio signal via a single return data path.

14. The non-transitory, tangible computer readable storage medium of claim 13, wherein the method includes:
creating an optimized acceleration module comprises deriving an offload wrapper for each of the post-processing modules; and
controlling each of the associated post-processing module via the control paths comprises sending control signals from the post-processing modules, through the offload wrappers, and to the associated post-processing modules.

15. The non-transitory, tangible computer readable storage medium of claim 13, wherein the method includes:
rendering the post-processed buffer packet of the decoded audio signal on an audio output device that is controlled by the first processor and not controlled by the second processor.

16. The non-transitory, tangible computer readable storage medium of claim 13, wherein the buffer packet is a first buffer packet, and wherein the method further comprises:
sending a second buffer packet of the decoded audio signal to the second processor before the first buffer packet is rendered; and
storing the second buffer packet in a cache on the second processor while the first buffer packet is being post-processed on the second processor.

17. The non-transitory, tangible computer readable storage medium of claim 13, wherein the decoded audio signal is generated from one of a video file, an audio file, and a game file.

18. The non-transitory, tangible computer readable storage medium of claim 13, wherein the method includes:
channel mixing the buffer packet of the decoded audio signal, and
resampling the buffer packet of the decoded audio signal.

* * * * *